(12) United States Patent
Hosaka

(10) Patent No.: US 10,514,740 B2
(45) Date of Patent: Dec. 24, 2019

(54) COMPUTER DEVICE AND COMPUTER-READABLE STORAGE MEDIUM

(71) Applicant: HITACHI, LTD., Tokyo (JP)

(72) Inventor: Fumiaki Hosaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 15/763,149

(22) PCT Filed: Jan. 22, 2016

(86) PCT No.: PCT/JP2016/051939
§ 371 (c)(1),
(2) Date: Mar. 26, 2018

(87) PCT Pub. No.: WO2017/126130
PCT Pub. Date: Jul. 27, 2017

(65) Prior Publication Data
US 2018/0267588 A1 Sep. 20, 2018

(51) Int. Cl.
*G06F 1/30* (2006.01)
*G06F 12/16* (2006.01)
(Continued)

(52) U.S. Cl.
CPC ............ *G06F 1/30* (2013.01); *G06F 11/1076* (2013.01); *G06F 12/16* (2013.01); *H02J 9/00* (2013.01); *H02J 9/06* (2013.01); *H02M 1/10* (2013.01)

(58) Field of Classification Search
CPC .... G06F 1/30; G06F 11/1076; G06F 11/1088; G06F 11/2015
See application file for complete search history.

(56) References Cited

U.S. PATENT DOCUMENTS

2002/0131788 A1 9/2002 Nakaya
2006/0242458 A1* 10/2006 Feldman ............. G06F 11/1441
714/14
(Continued)

FOREIGN PATENT DOCUMENTS

JP 07-064652 A 3/1995
JP 2000-194607 A 7/2000
(Continued)

OTHER PUBLICATIONS

International Search Report of PCT/JP2016/051939 dated Feb. 23, 2016 and Written Opinion.

*Primary Examiner* — Jigar P Patel
(74) *Attorney, Agent, or Firm* — Mattingly & Malur, PC

(57) ABSTRACT

A computer device includes a power supply unit which includes an instantaneous power failure resistance capacitor and converts an alternating current into a direct current and outputs the direct current, and a main body which includes a main storage unit having a non-volatile storage area and a processor for executing programs, wherein the power supply unit includes a power failure detection unit which detects that a supply of the alternating current has been stopped, and wherein the main body includes a logical device which, when the detection is notified from the power failure detection unit, instructs the processor within a retention time of the instantaneous power failure resistance capacitor to perform transaction processing of converting data of a buffer in the processor into reusable data and transferring the reusable data to the main storage unit.

7 Claims, 4 Drawing Sheets

(51) Int. Cl.
*H02J 9/06* (2006.01)
*G06F 11/10* (2006.01)
*H02J 9/00* (2006.01)
*H02M 1/10* (2006.01)

(56) References Cited

U.S. PATENT DOCUMENTS

| | | |
|---|---|---|
| 2014/0215277 A1 | 7/2014 | Judd |
| 2014/0317436 A1 | 10/2014 | Yuasa et al. |
| 2016/0188414 A1* | 6/2016 | Jayakumar .......... G06F 12/0804 |
| | | 711/103 |
| 2017/0098956 A1* | 4/2017 | Sarti ................ H02J 9/066 |

FOREIGN PATENT DOCUMENTS

| | | |
|---|---|---|
| JP | 2002-359970 A | 12/2002 |
| JP | 2008-140234 A | 6/2008 |
| JP | 2011-224923 A | 11/2011 |
| JP | 2011-254660 A | 12/2011 |
| JP | 2014-215661 A | 11/2014 |
| JP | 2014-220874 A | 11/2014 |

\* cited by examiner

COMPUTER DEVICE AND COMPUTER-READABLE STORAGE MEDIUM

TECHNICAL FIELD

The present invention relates to a computer device and a computer-readable storage medium, and, for example, can be suitably applied to a storage server connected to a storage network.

BACKGROUND ART

With a storage controller connected to a storage network or a server device connected to a network, it is desirable to continue operating without losing its function, as much as possible, even during a power failure. For example, when it is not possible to receive the supply of AC power from the outside, the function can be maintained for a predetermined time by using a battery or the like.

Nevertheless, the battery required for maintaining the overall device or overall system during a power failure must have a large capacity, and, because such a battery is expensive, large and heavy, it would be unrealistic to equip all systems and devices with such a function unless it is a system that must constantly be in operation even during emergencies. Moreover, the users' needs are often sufficiently satisfied so as long as it is possible to at least resume processing, at the time of power supply recovery, from the state when the power was lost.

PTL 1 discloses reducing the load power by lowering the processing performance according to the duration of power failure, and thereby extending the retention time during an instantaneous power failure. PTL 2 discloses securing the time required for data retention by discontinuing power supply to loads other than circuits required for data retention upon detecting an instantaneous power failure. PTL 3 discloses retaining cache data in a cache memory based on power feeding from a capacitor, and writing the cache data from the cache memory into a non-volatile memory based on power feeding from a battery upon satisfying predetermined conditions. PTL 4 discloses stopping a loading device when the capacity of a secondary battery, which supplies power in place of a main power supply, falls below a first threshold, and activating the loading device when the capacity of the second battery exceeds a second threshold based on regenerated electric power supply.

CITATION LIST

Patent Literature

[PTL 1] Japanese Unexamined Patent Application Publication No. 2011-254660
[PTL 2] Japanese Unexamined Patent Application Publication No. H7-064652
[PTL 3] Japanese Unexamined Patent Application Publication No. 2014-215661
[PTL 4] Japanese Unexamined Patent Application Publication No. 2014-220874

SUMMARY OF THE INVENTION

Problems to be Solved by the Invention

Meanwhile, in order to resume processing, at the time of power supply recovery, from the state when the power was lost, the state of the device at the time of power shutdown needs to be stored. While considered may be placing a small battery for storing such state of the device at the time of power shutdown, a battery is large and expensive in comparison to other components in a computer device or a server device in which smaller and thinner shapes are demanded. Furthermore, because a battery has a usable life and needs to be replaced even when it is not used, this may also lead to an increased burden in terms of maintenance.

The present invention was devised in view of the foregoing points, and an object of this invention is to provide a computer device and a computer-readable storage medium capable of retaining the state at the time of power shutdown without having to use an additional power supply device such as a battery.

Means to Solve the Problems

In order to achieve the foregoing object, the computer device of the present invention comprises a power supply unit which includes an instantaneous power failure resistance capacitor and converts an alternating current into a direct current and outputs the direct current, and a main body which includes a main storage unit having a non-volatile storage area and a processor for executing programs, wherein the power supply unit includes a power failure detection unit which detects that a supply of the alternating current has been stopped, and wherein the main body includes a logical device which, when the detection is notified from the power failure detection unit, instructs the processor within a retention time of the instantaneous power failure resistance capacitor to perform transaction processing of converting data of a buffer in the processor into reusable data and transferring the reusable data to the main storage unit.

Moreover, in order to achieve the foregoing object, a computer-readable storage medium of the present invention is recorded with a program for executing the steps of: detecting that a supply of an alternating current has been stopped; and when the stoppage of supply of the alternating current is detected, converting volatile memory data in a processor into reusable data and transferring the reusable data to a main storage unit having a non-volatile storage area.

Advantageous Effects of the Invention

According to the present invention, it is possible to retain the state at the time of power shutdown without having to use an additional power supply device such as a battery.

DESCRIPTION OF EMBODIMENTS

Figure 1:
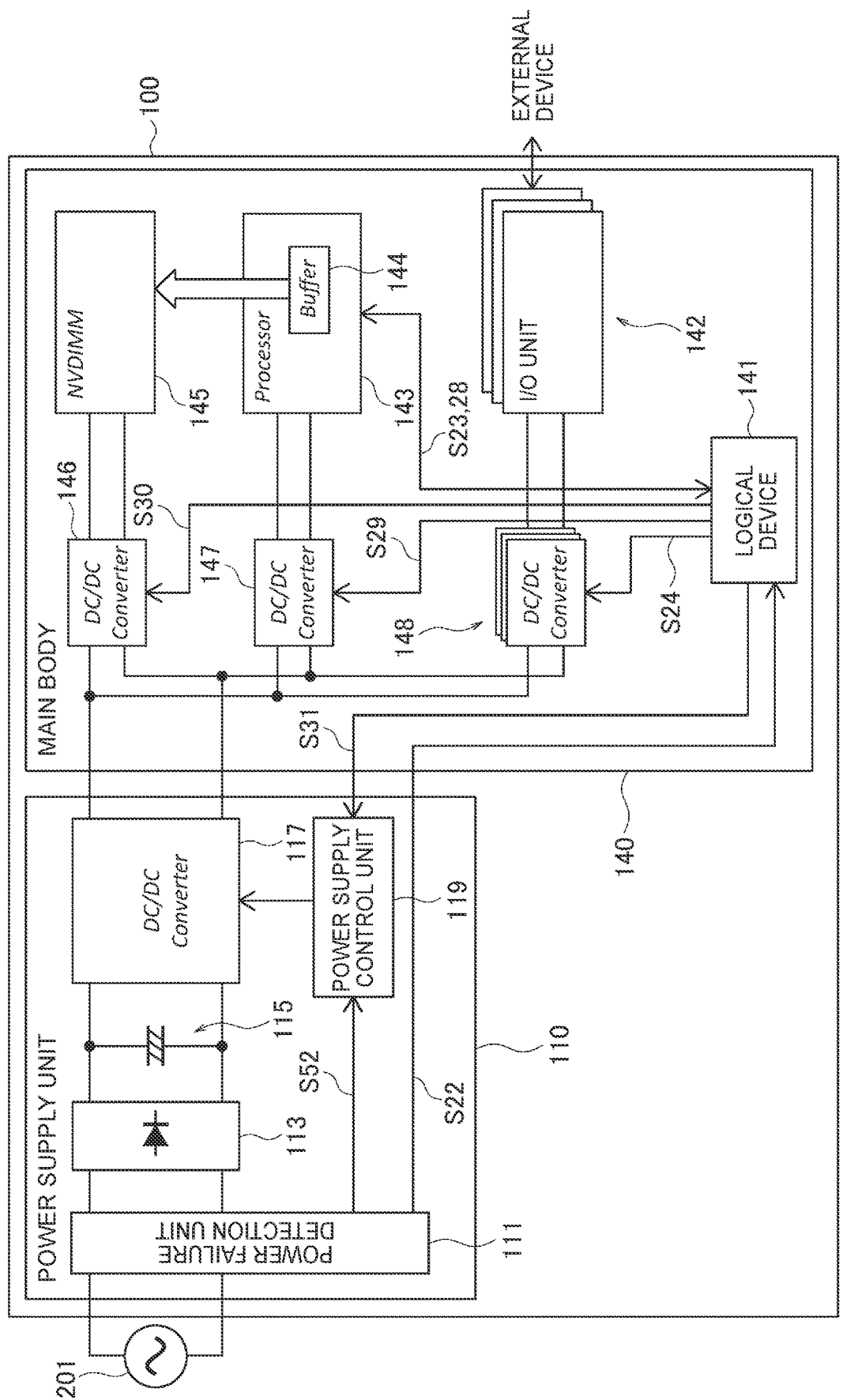
FIG. 1 is a diagram schematically showing a computer device according to an embodiment of the present invention.

An embodiment of the present invention is now explained in detail with reference to the appended drawings. In the ensuing explanation, the same elements are given the same reference numeral, and redundant explanations will be omitted.

(1) Configuration of Computer Device According to this Embodiment

FIG. 1 is a diagram schematically showing a computer device 100 according to an embodiment of the present invention. As shown in FIG. 1, the computer device 100 includes a power supply unit 110 which acquires an alternating current from an external AC power supply 201 and converts the alternating current into a direct current and outputs the direct current, and a main body 140 which receives the supply of the direct current from the power supply unit 110 and performs processing of digital information.

Here, the power supply unit 110 includes an AC/DC converter 113 which converts an alternating current into a direct current, a power supply voltage converter 117 which converts a DC voltage into a lower DC voltage, an instantaneous power failure resistance capacitor 115 which is disposed between the AC/DC converter 113 and the power supply voltage converter 117, a power failure detection unit 111 which is disposed between the AC/DC converter 113 and the AC power supply 201 and which detects that the supply of the alternating current from the AC power supply 201 has been stopped, and a power supply control unit 119 which stops the operation of the power supply voltage converter 117.

Moreover, the main body 140 includes a NVDIMM (Non-volatile Dual In-line Memory Module) 145 which is a main storage unit having a non-volatile storage area, a processor 143 which executes programs, an I/O unit 142 which serves as an interface with a host apparatus, a storage apparatus, a display device, an input device such as a mouse or a keyboard, a network device and other external devices, and a logical device 141 which, when detection of a power failure is notified from the power failure detection unit 111, instructs the processor 143 to perform transaction processing of converting data of a buffer 144 as a volatile memory in the processor 143 into reusable data and transferring the reusable data to the NVDIMM 145 as the main storage unit. The NVDIMM 145, the processor 143 and the I/O unit 142 are respectively connected to a main storage unit voltage converter 146, a processor unit voltage converter 147 and an I/O unit voltage converter 148 as DC/DC converters for receiving the supply of power.

Here, the computer device 100 may be a storage control server which performs communication with a storage apparatus via the I/O unit 142, or a storage apparatus which additionally comprises a storage such as a hard disk or a flash memory within the main body 140, and performs communication with a host apparatus via the I/O unit 142. Moreover, the buffer 144 may be a volatile memory which stores command data scheduled to be executed in the processor 143 and data scheduled to be used in the processor 143.

Moreover, the NVDIMM 145 is a memory that is used by the processor 143 as a DRAM (Dynamic Random Access Memory) disposed in a DIMM (Dual Inline Memory Module) slot, and is configured so that the data of the NVDIMM 145 will not be lost even when power is lost. Specifically, for instance, the NVDIMM 145 may be configured entirely from non-volatile memories, and store/read data using such non-volatile memories for each access from the processor 143, or be configured from both a volatile DRAM and a non-volatile flash memory, wherein the processor 143 accesses the DRAM and performs normal processing, and data stored in the DRAM is transferred to the flash memory using a battery when power is lost. Here, while this embodiment uses the NVDIMM 145, any other main storage unit having a non-volatile storage area may be used in addition to a NVDIMM.

(2) Initialization Processing Performed by Logical Device

Figure 2:
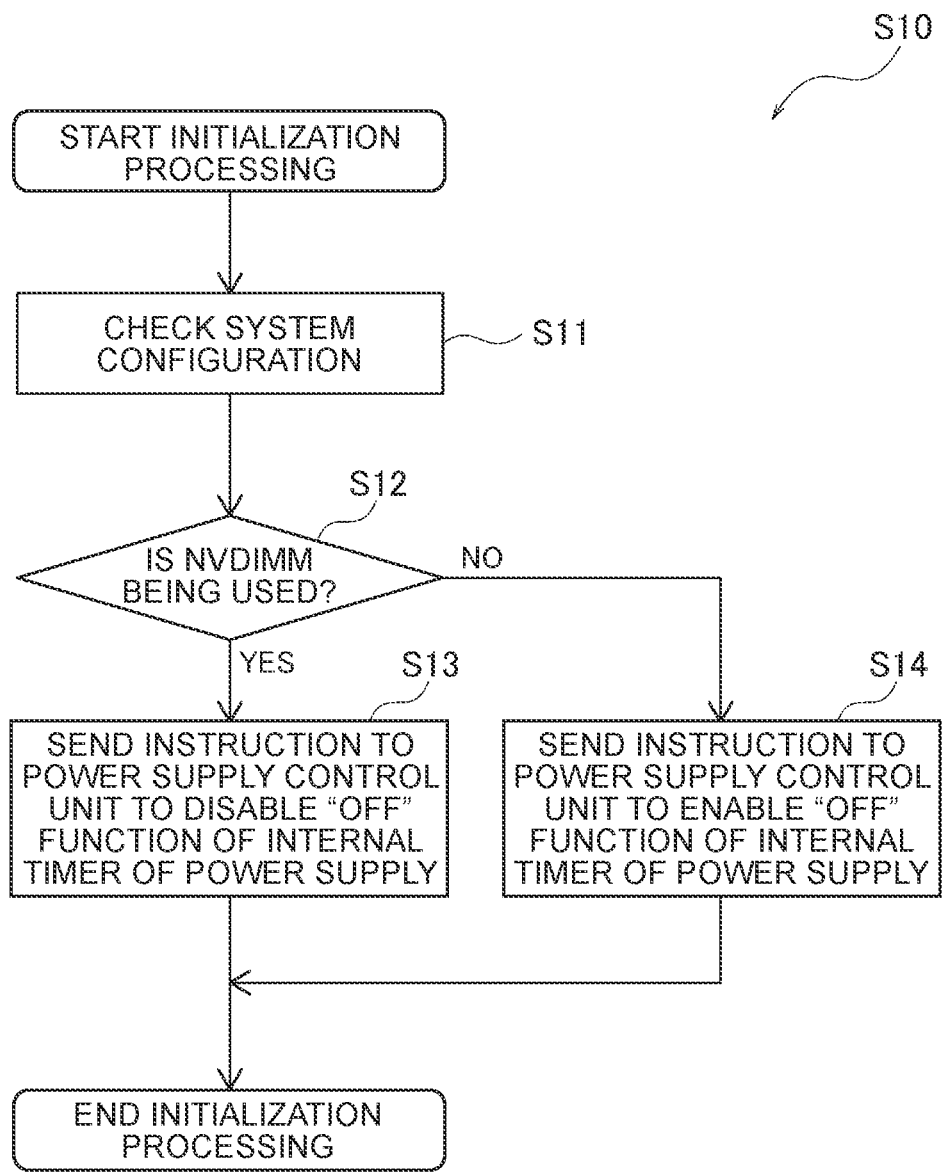
FIG. 2 is a flowchart showing the initialization processing to be performed by a logical device.

FIG. 2 is a flowchart showing the initialization processing S10 to be performed by the logical device 141. As shown in FIG. 2, in the initialization processing S10, the logical device 141 foremost confirms the system configuration of the computer device 100 (S11), and subsequently determines whether the main storage unit such as the NVDIMM 145 having a non-volatile storage area is being used (S12). Here, when the NVDIMM 145 is being used, the logical device 141 instructs the power supply control unit 119 to disable the internal timer-based power OFF function (S13), and then ends the initialization processing S10. Meanwhile, when the NVDIMM 145 is not being used, the logical device 141 instructs the power supply control unit 119 to enable the internal timer-based power OFF function (S14), and then ends the initialization processing S10. Here, the main storage unit such as the NVDIMM 145 may also be defined as a storage unit having a non-volatile region in which a processor transfers data at a transfer speed of, for example, 528 MB/S or higher, and more preferably 1 GB/S or higher. Moreover, the main storage unit such as the NVDIMM 145 may also be defined as a storage unit which is compatible with the DIMM standard and which has a non-volatile region.

Figure 3:
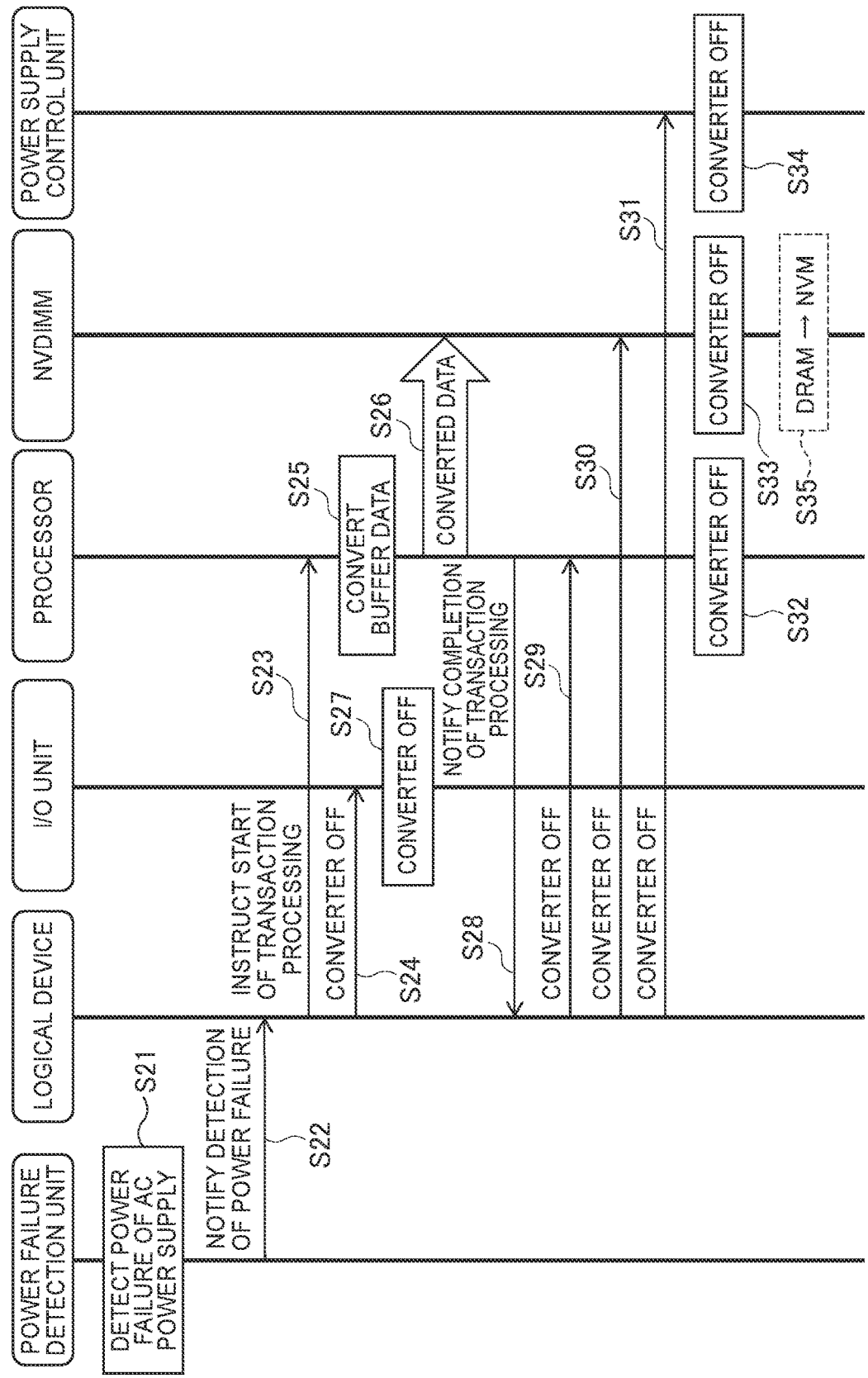
FIG. 3 is a sequence diagram showing the AC power supply power failure detection processing in a case where a NVDIMM is being used.

(3) AC Power Supply Power Failure Detection Processing in a Case Where NVDIMM is Being Used FIG. 3 is a sequence diagram showing the AC power supply power failure detection processing S20 in a case where the NVDIMM 145 is being used. As shown in FIG. 3, in the AC power supply power failure detection processing S20, when the power failure detection unit 111 of the power supply unit 110 detects a power failure of the AC power supply 201 (S21), the power failure detection unit 111 sends a power failure detection notice to the logical device 141 of the main body 140 (S22). Here, when a power failure occurs, the electric power supply from the power supply unit 110 to the main body 140 is switched to the electric power supply from the instantaneous power failure resistance capacitor 115. The logical device 141 that received the power failure detection notice S22 instructs the processor 143 to start the transaction processing (S23) and subsequently instructs the processor 143 to turn OFF the power of the I/O unit voltage converter 148 connected to the I/O unit 142 (S24), and the power of the I/O unit voltage converter 148 is thereby turned OFF (S27). Consequently, because power will not be consumed in the I/O unit 142, the power from the instantaneous power failure resistance capacitor 115, which is used for the transaction processing, can be secured. Nevertheless, the power of the I/O unit voltage converter 148 does not necessarily need to be turned OFF.

Meanwhile, the processor 143 that received the instruction for starting the transaction processing converts the data stored in the buffer 144 into reusable data (S25), and stores the converted data in the NVDIMM 145 (S26). Consequently, by returning the contents stored in the NVDIMM 145 to the buffer 144 when power is restored, it is possible to resume processing from the processing that was being performed at the time of power shutdown. When the storage is complete, the processor 143 sends a notice to the logical device 141 to the effect that the transaction processing is complete (S28), and the logical device 141 that received the notice to the effect that the transaction processing is complete gives instructions for turning OFF the power of the processor unit voltage converter 147 connected to the processor 143 and turning OFF the power of the main storage unit voltage converter 146 connected to the NVDIMM 145 (S29, S30), and instructs the power supply control unit 119 to turn OFF the power of the power supply voltage converter 117 (S31). The power of the processor unit voltage converter 147, the power of the main storage unit voltage converter 146, and the power of the power supply voltage converter 117 are respectively turned OFF (S32, S33, S34), and power will no longer be consumed in the main body 140. As a result of stopping the power supply of the main body 140, it is possible to prevent inconsistencies in the stored contents or failures caused by the continued operation of certain components. Moreover, it is possible to prevent a re-rush current at the time of power supply recovery by turning OFF the power of the power supply voltage converter 117. Nevertheless, the power of the processor unit voltage converter 147, the main storage unit voltage converter 146, and the power supply voltage converter 117 does not necessarily need to be turned OFF.

Figure 4:
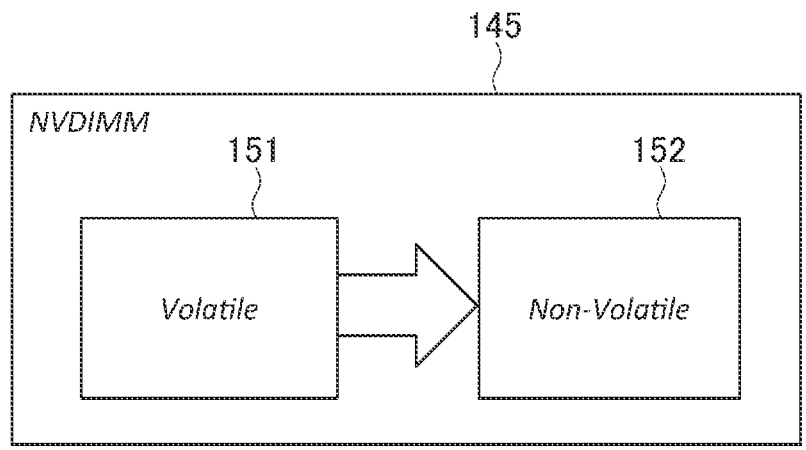
FIG. 4 is a diagram showing an example of the configuration of a NVDIMM.

Here, when the NVDIMM 145 is configured, for example, from a volatile memory 151 such as a DRAM and a non-volatile such as a flash memory as shown in FIG. 4, an internal battery or the like is used to transfer data from the volatile memory 151 to the non-volatile memory 152 within the NVDIMM 145 (S35). In the foregoing case, because the non-volatilization processing is performed within the NVDIMM 145 merely by the processor 143 transferring the data of the buffer 144 to the volatile memory of the NVDIMM 145, the save processing using the power of the instantaneous power failure resistance capacitor 115 can be completed only by transferring data to a volatile memory which is faster and of lower power consumption, and the non-volatilization processing can be completed more reliably.

As described above, in this embodiment, because the contents of the buffer 144 in the processor 143 can be saved in addition to the contents of the memory inserted in the DIMM slot without having to use an additional battery or capacitor, at the time of power supply recovery, it is possible to resume processing from the processing that is subsequent to the original processing which was terminated at the time of power shutdown. Moreover, as a result of being equipped with the power failure detection unit 111 and the logical device 141, the contents of the buffer 144 can be saved by using the instantaneous power failure resistance capacitor 115 of the power supply unit 110.

Figure 5:
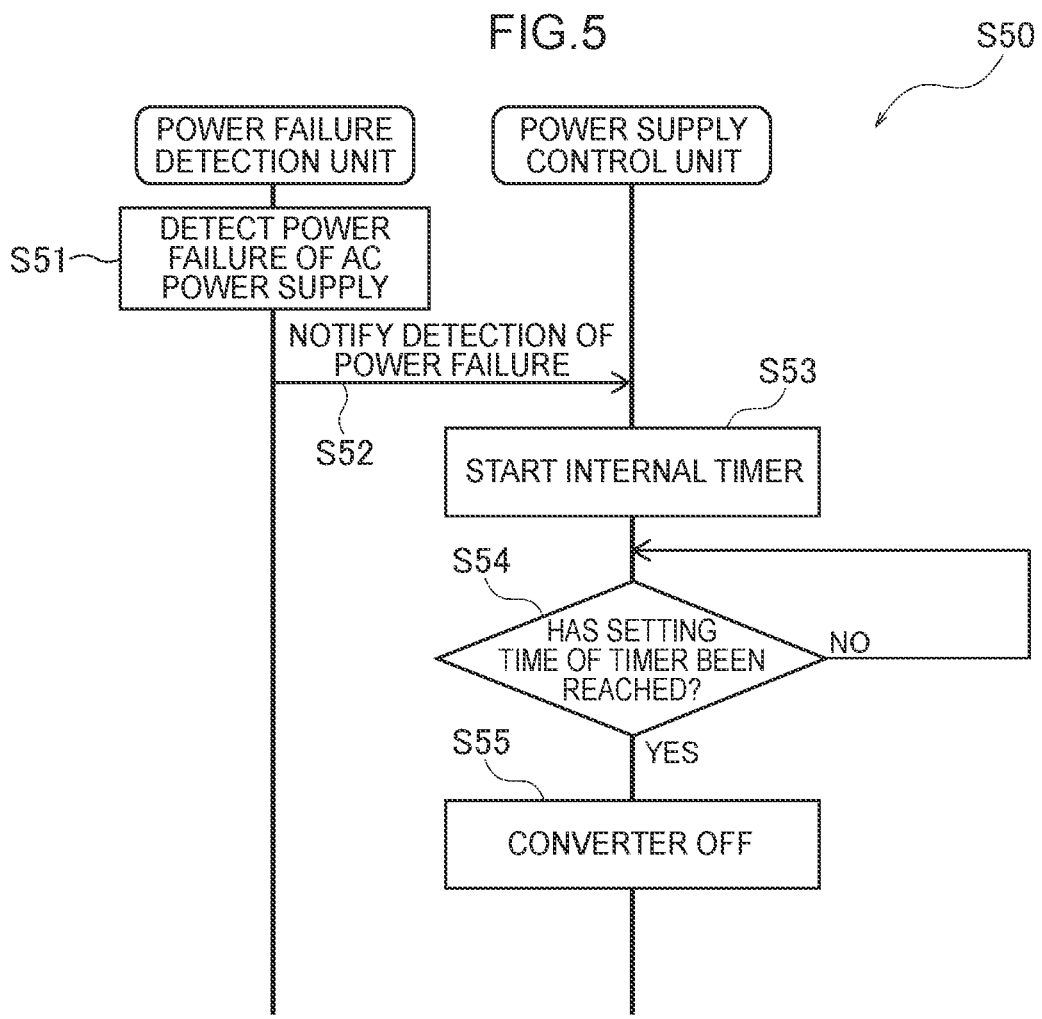
FIG. 5 is a sequence diagram showing the AC power supply power failure detection processing in a case where a NVDIMM is not being used.

(4) AC Power Supply Power Failure Detection Processing in a Case Where NVDIMM is not Being Used FIG. 5 is a sequence diagram showing the AC power supply power failure detection processing S50 in a case where the NVDIMM 145 is not being used. As shown in FIG. 5, in the AC power supply power failure detection processing S50, when the power failure detection unit 111 of the power supply unit 110 detects a power failure of the AC power supply 201 (S51), the power failure detection unit 111 sends a power failure detection notice to the power supply control unit 119 (S52). The power supply control unit 119 that received the power failure detection notice starts an internal timer (S53), determines whether the setting time of the timer has been reached (S54), and repeats step S54 when the setting time of the timer has not been reached. When the setting time of the timer has not been reached, the power supply control unit 119 turns OFF the power of the power supply voltage converter 117, and power will no longer be consumed in the main body 140. As described above, when the NVDIMM 145 is not used, by simultaneously turning OFF the power of the main body 140 based on the setting time, it is possible to prevent inconsistencies in the stored contents or failures, as well as prevent the occurrence of failures caused by a re-rush current when the external AC power supply 201 is restored.

(5) Effect of this Embodiment

In this embodiment, because a computer system comprises the power supply unit 110 which converts an alternating current into a direct current and outputs the direct current, and the main body 140 which includes the NVDIMM 145 as a main storage unit having a non-volatile storage area and the processor 143 for executing programs, and the power supply unit 110 includes the power failure detection unit 111 which detects that a supply of the alternating current has been stopped, and the main body 140 includes the logical device 141 which, when the detection is notified from the power failure detection unit 111, instructs the processor 143 to perform transaction processing of converting data of a buffer 144 in the processor 143 into reusable data and transferring the reusable data to the NVDIMM 145, it is possible to retain the state at the time of power shutdown by using an instantaneous power failure resistance capacitor 115 of the power supply unit 110, capable of supply greater power, without having to use an additional power supply device such as a battery.

Moreover, the logical device 141 may stop I/O unit voltage converter 148 which supplies operating power to the I/O unit 142 that communicates with an external storage medium or an external device before the completion of the transaction processing. In the foregoing case, because it is possible to stop in advance power consumption that is unrelated to the transaction processing, it is possible to secure more power to be used in the transaction processing.

Moreover, the logical device 141 may stop the processor unit voltage converter 147 which supplies operating power to the processor 143 and stop the main storage unit voltage converter 146 which supplies operating power to the NVDIMM (main storage unit) 145 after the completion of the transaction processing. In the foregoing case, it is possible to prevent inconsistencies in the stored contents or failures caused by the continued operation of certain components. Moreover, the power supply unit 110 may further include the power supply voltage converter 117 which supplies a DC voltage to the main body 140, and the logical device 141 may stop the power supply voltage converter 117 after the completion of the transaction processing. In the foregoing case, it is possible to further prevent a re-rush current at the time of power supply recovery.

Moreover, in a case where the detection is notified from the power failure detection 111 unit and the computer device does not include a main storage unit such as the NVDIMM 145 having a non-volatile storage area, the logical device 141 may stop the power supply voltage converter 117 after the lapse of a predetermined time. In the foregoing case, it is possible to prevent inconsistencies in the stored contents or failures caused by the continued operation of certain components, and additionally prevent a re-rush current at the time of power supply recovery.

Moreover, the reusable data may be command data to be executed by the processor 143. In the foregoing case, at the time of power supply recovery, the processor 143 can resume from the processing that was being performed at the time of power shutdown.

Moreover, the NVDIMM 145 may be equipped with both the volatile memory 151 and the non-volatile memory 152, and, in particular, when the power of the main storage unit voltage converter 146 of the NVDIMM 145 is turned OFF, data of the volatile memory may be transferred to the non-volatile memory. In the foregoing case, in the transaction processing, because the non-volatilization processing is performed within the NVDIMM 145 merely by the data of the buffer 144 being transferred to the volatile memory of the NVDIMM 145, the save processing using the power of the instantaneous power failure resistance capacitor 115 can be completed only by transferring data to a volatile memory which is faster and of lower power consumption, and the non-volatilization processing can be completed more reliably.

INDUSTRIAL APPLICABILITY

The present invention can be applied, for instance, to a storage server connected to a storage network.

REFERENCE SIGNS LIST

100 computer device
110 power supply unit
111 power failure detection unit
113 converter
115 instantaneous power failure resistance capacitor
117 power supply voltage converter
119 power supply control unit
140 main body
141 logical device
142 I/O unit
143 processor
144 buffer
145 NVDIMM
146 main storage unit voltage converter
147 processor unit voltage converter
148 I/O unit voltage converter
151 volatile memory
152 non-volatile memory
201 AC power supply

The invention claimed is:

1. A computer system comprising a power supply unit which includes an instantaneous power failure resistance capacitor and converts an alternating current into a direct current and outputs the direct current, and a main body which includes a main storage unit having a non-volatile storage area and a processor for executing programs,
    wherein the power supply unit includes a power failure detection unit which detects that a supply of the alternating current has been stopped,
    wherein the main body includes a logical device which, when the detection is notified from the power failure detection unit, instructs the processor within a retention time of the instantaneous power failure resistance capacitor to perform transaction processing of converting data of a buffer in the processor into reusable data and transferring the reusable data to the main storage unit,
    wherein the power supply unit further includes a power supply voltage converter which supplies a DC voltage to the main body,
    wherein the logical device stops the power supply voltage converter after the transaction processing is completed, and
    wherein, in a case where the detection is notified from the power failure detection unit and the computer device does not include the main storage unit, the logical device stops the power supply voltage converter after a lapse of a predetermined time.

2. The computer device according to claim 1,
    wherein, when the detection is notified from the power failure detection unit, the logical device stops an I/O unit voltage converter which supplies operating power to an I/O unit that communicates with an external storage medium or an external device.

3. The computer device according to claim 1,
    wherein, after the transaction processing is completed, the logical device stops a processor unit voltage converter which supplies operating power to the processor, and stops a main storage unit voltage converter which supplies operating power to the main storage unit.

4. The computer device according to claim 1,
    wherein the reusable data is command data to be executed by the processor.

5. The computer device according to claim 1,
    wherein the main storage unit is a DIMM (Dual Inline Memory Module) including a volatile memory and a non-volatile memory or a DIMM including a non-volatile memory.

6. The computer device according to claim 1,
    wherein the computer device is a storage apparatus or a server.

7. A non-transitory computer-readable storage medium in a computer and storing a program which instructs a processor to control the steps of:
    when the stoppage of supply of the alternating current is detected by a power failure detection unit and notified to a logical device, receiving an instruction from the logical device within a retention time of an instantaneous power failure resistance capacitor to perform transaction processing of converting data of a buffer in the processor into reusable data;
    performing the transaction processing and transferring the reusable data to a main storage unit having a non-volatile storage area;
    instructing the logical device to stop a power supply voltage converter, which supplies a DC voltage to the main body, after the transaction processing is completed; and
    in a case where the stoppage of supply of the alternating current is detected by the power failure detection unit and the computer device does not include the main storage unit, stopping the power supply voltage converter after a lapse of a predetermined time.

* * * * *